United States Patent [19]
Wall, deceased et al.

[11] 3,853,828
[45] Dec. 10, 1974

[54] PROCESS FOR CROSSLINKING FLUOROCARBON POLYMERS

[75] Inventors: Leo A. Wall, deceased, late of McLean, Va. by Leola Grace Wall, administratrix; Daniel W. Brown, Bethesda; Roland E. Florin, Takoma Park, both of Md.

[73] Assignee: The United States of America as represented by the Secretary of the Army, Washington, D.C.

[22] Filed: Nov. 21, 1973

[21] Appl. No.: 418,000

[52] U.S. Cl. ........... 260/87.5 A, 260/87.7, 260/91.5, 260/92.1 S, 204/159.2
[51] Int. Cl. ............................................. C08f 27/00
[58] Field of Search ......... 260/92.1 S, 91.5, 87.5 A, 260/87.7

[56] References Cited
UNITED STATES PATENTS
2,497,046  2/1950  Kropa ................................ 260/92.1

Primary Examiner—Stanford M. Levin
Attorney, Agent, or Firm—Edward J. Kelly; Herbert Berl; A. Victor Erkkila

[57] ABSTRACT

A method for crosslinking specified fluorocarbon polymers, such as Viton elastomers (copolymers of vinylidene fluoride and hexafluoropropene), by exposing the polymer to dilute fluorine gas, e.g., 5% fluorine in helium, preferably under ordinary temperature and pressure, using relatively small amounts of fluorine so that crosslinking of the polymer results with substantially no introduction of fluorine into the polymer molecule. The crosslinked polymers or vulcanizates thus obtained possess better thermal stability than vulcanizates produced from such fluorocarbon polymers by prior art crosslinking methods.

13 Claims, 3 Drawing Figures

1

PROCESS FOR CROSSLINKING FLUOROCARBON POLYMERS

BACKGROUND OF THE INVENTION

Existing elastomeric vinylidene fluoride copolymers, such as Viton and Kel-F elastomers, contain large amounts of vinylidene fluoride in the copolymer. These elastomers are usually crosslinked (that is, cured or vulcanized) by treatment with amine and peroxide type curing agents and magnesium oxide. Post cures for 24 hours at 200°–250°C. are required. Such temperatures may soften tempered metals thus preventing use of coatings of Viton. The vulcanizates are less stable than the raw gums. The curing agents appear to catalyze the decomposition process. At the upper temperature limit of their use (about 200°C.), the cured elastomers suffer severe permanent set due to continued crosslinking.

Other soluble elastomeric fluorocarbon copolymers containing up to 90% tetrafluoroethylene have been developed, as described in copending application Ser. No. 289,019, filed Sept. 14, 1972, "Highly Fluorinated Polymeric Material," Leo A. Wall and Daniel W. Brown, inventors, issued as U.S. Pat. No. 3804817, Apr. 16, 1974, and Polymer Preprints 12,302 (1971), D. W. Brown and L. A. Wall. These polymers resist hydrogen fluoride elimination and swelling by ketone and ester solvents better than Viton or Kel-F. In the past the only method known for crosslinking the tetrafluoroethylene based copolymers was to expose them to ionizing radiation, i.e., gamma rays. This process has three adverse effects:

1. As the radiation dose is increased, the portion of material soluble in hexafluorobenzene at 25°C. (hereinafter called "sol") tends to reach a limit of about 15%.
2. The swelling ratios listed for the radiation formed vulcanizates are high, usually near 8. Application of the well-known equation of Flory, connecting swelling and the density of elastic chains, gives values of about $3-5 \times 10^{-5}$ mols per gram for the latter. Both the high sol and high swelling are caused by concomitant scissioning and crosslinking, the ratio of the former to the latter being about 0.3. The practical result is to give vulcanizates of low modulus that break at about 50% elongation.
3. The most serious adverse effect is that the radiation formed vulcanizates possess much lower thermal stability than the original polymer. This is shown in FIG. 1, wherein the fraction of polymer volatilized on heating in vacuum at a programmed rate is plotted against temperature. The vulcanizate obtained by irradiation with gamma rays (curve 3), even after extraction of the sol (curve 4), begins to lose weight at 275°C., whereas the original polymer (curve 1) starts to lose weight at 385°C. This is obviously a severe handicap, since the prospective use of the polymer is at an upper temperature limit of 200°–300°C.

SUMMARY OF THE INVENTION

It is an object of the present invention to provide a novel process for crosslinking fluorocarbon polymers. It is a further object to provide a process for crosslinking fluorocarbon polymers of a particular group at nearly ambient temperature without requiring incorporation of solid or liquid additives to produce vulcanizates possessing better stability at elevated temperatures than those derived by crosslinking the said polymers by prior art methods.

It has been found that the foregoing objects can be achieved by contacting a fluorocarbon polymer of the following group:

3,3,3-trifluoropropene homopolymer
$\alpha,\beta,\beta$-trifluorostyrene homopolymer 1,2,3,4,5-pentafluorostyrene homopolymer
vinylidene fluoride-hexafluoropropene copolymer
vinylidene fluoride-chlorotrifluoroethylene copolymer
3,3,3-trifluoropropene-tetrafluoroethylene copolymer
5,5,5,4,4,3,3-heptafluoropentene-1-tetrafluoroethylene copolymer with fluorine diluted with a large amount of helium, argon, or other inert gas, e.g., 5% fluorine in helium, preferably at ambient temperature and pressure, using a relatively small amount of fluorine, whereby the polymer is crosslinked and substantially no fluorine is introduced into the polymer molecule. This is considered unobvious and surprising, particularly in view of the fact that other closely related fluorocarbon polymers, e.g. 3,3,3,2-tetrafluoropropene homopolymer and copolymer with tetrafluoroethylene, 3,3,3,1-tetrafluoropropene homopolymer, and 5,5,5,4,4,3,3-heptafluoropentene homopolymer are degraded rather than crosslinked when exposed to dilute fluorine under similar conditions.

In the past other investigators have treated various polymers, including fluorocarbon polymers, with gaseous fluorine, by methods wherein generally large amounts of fluorine were employed and considerable amounts of fluorine were introduced into the polymer molecule (see, for example, J. L. Margrave and R. L. Lagow, Chem. Eng. News, 48, 40–41 (Jan. 12, 1970); H. Schonhorn and R. H. Hansen, J. Appl. Polym. Sci. 12, 1,231–7 (1968); H. Shinohara, M. Iwasaki and S. Tsujimura, J. Polym. Sci. A-1, 10, 2,129–2,137 (1972). The process of the present invention is distinguished in that it utilizes a relatively small amount of gaseous fluorine mixed with a large amount of an inert diluent gas, e.g., helium, to treat the aforementioned group of fluorocarbon polymers, which results in a superior crosslinking of such polymers with little, if any, introduction of fluorine into the polymer molecule by replacement of hydrogen or otherwise.

DESCRIPTION OF THE PREFERRED EMBODIMENTS

The following examples serve to illustrate the specific embodiments of the method for crosslinking the aforesaid fluorocarbon polymers according to the present invention.

Except for the commercial polymers, the polymers employed were obtained by radiation-induced polymerizations at high pressure as disclosed in page 127 of "Fluoropolymers," L. A. Wall, Wiley Interscience, New York, 1972. Copolymer compositions were calculated from carbon contents determined in combustion analyses. Polymers obtained commercially were Viton, a 4 to 1 copolymer of vinylidene fluoride and hexafluoropropene having a number average molecular weight of about 500,000, and Kel-F Elastomer 3700, a 3.5 to 1 copolymer of vinylidene fluoride and chlorotrifluoroethylene of molecular weight about 400,000. Viton and Teflon are trade names of E. I. du Pont de Nemours and Co., and Kel-F Elastomer is a trade name of Minnesota Mining and Manufacturing Co.

Figure 2:
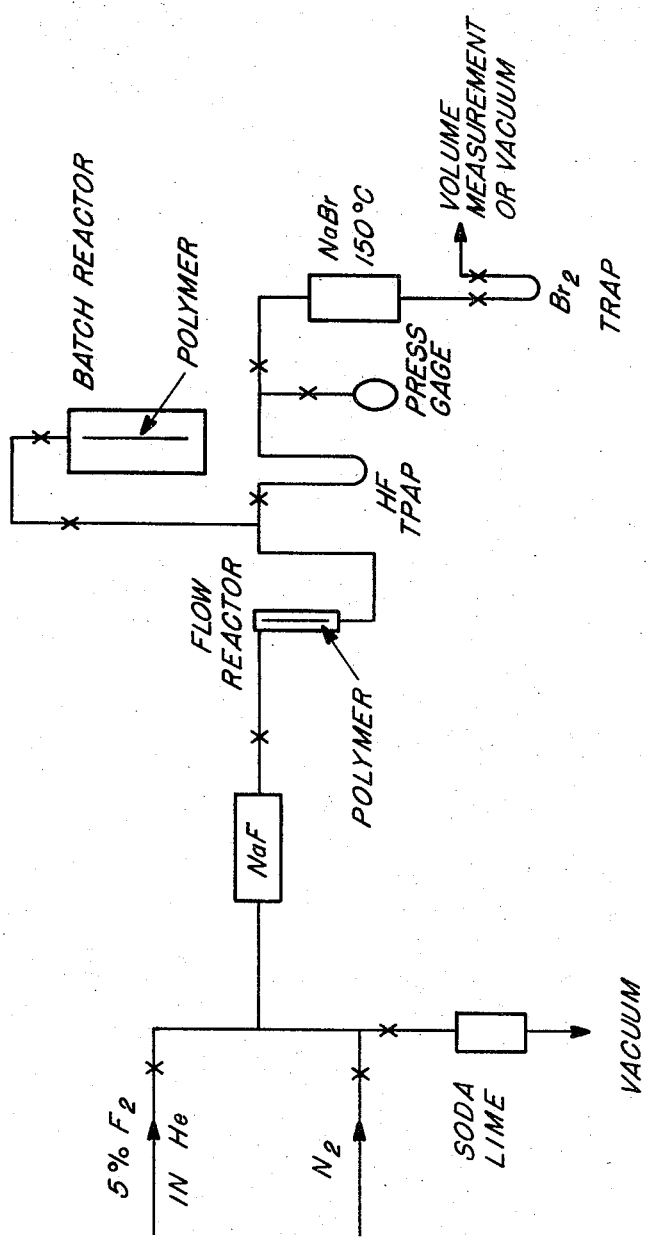

The polymers were hot pressed into films of desired thickness. Strips weighing 0.02 – 0.2 g were exposed to the fluorine mixture in batch or flow reactors. The apparatus employed is shown in FIG. 2, copper being used except as noted.

The fluorine measuring capability was tested twice by passing the 5% fluorine-helium mixture at 30 cm$^3$/min through the system in the absence of polymer. Assuming that the nominal content of 5% fluorine is accurate, $3.7 \times 10^{-4}$ mol fluorine was used in each case. The first passage generated $3.3 \times 10^{-4}$ mol bromine and $0.4 \times 10^{-4}$ mol hydrogen fluoride. The second passage generated $3.8 \times 10^{-4}$ mol bromine and $0.4 \times 10^{-4}$ mol hydrogen fluoride. Apparently this method of measuring fluorine appears to have an uncertainty of about 10%. Probably the hydrogen fluoride formed in reaction between fluorine and hydroxyl groups on the wall.

In carrying out the experiment the fluorine mixture was passed over sodium fluoride to eliminate residual hydrogen fluoride. It was then passed through a stainless steel U tube, which contained the polymer sample, to a cold trap that condenses any hydrogen fluoride formed. From there the gases flowed over hot sodium bromide in a glass tube which formed bromine from the remaining fluorine (L. K. Nash, Anal. Chem, 21, 980 (1949). The gases then entered a glass cold trap having glass-Teflon valves in which the bromine condensed. The helium volume was then measured by displacing water. The fluorine charged was calculated from this volume. The amount of hydrogen fluoride was calculated from the pressure that developed on warming its trap to 25°C. The pressure in this trap was always below 10cm, Hg, thus avoiding serious effects due to association. The bromine trap was warmed to room temperature and weighed to determine the bromine collected.

In batch operation a stainless steel batch reactor of 300cm$^3$ capacity was used instead of the U tube. After insertion of the polymer sample, the batch reactor was evacuated and charged to one atmosphere with 5 mol percent fluorine in helium. Initially the fluorine concentration was chosen so that there were about 10 times as many monomer units of the polymer as fluorine molecules charged to the reactor. After 20 hours at ambient temperature (25°C.) the reactor was vented to and evacuated through the traps. On reweighing the polymer sample thus treated it was usually found that no increase in weight thereof had occurred, nor was there evidence of vigorous reaction. However, when the fluorine mixture was passed rapidly through a polyethylene tube, melting and charring of the tube were observed, indicating that non-fluoropolymers might have behaved differently.

Dry nitrogen was passed through the system when it was not in use. For reactions above ambient temperature, the U tube was heated in water and the batch reactor was detached and placed in an oven.

Hexafluorobenzene was generally used in determining the intrinsic viscosities, sol contents, and swelling ratios. Benzene and methyl ethyl ketone were used with poly $\alpha,\beta,\beta$-trifluorostyrene and Kel-F elastomer, respectively because neither polymer is soluble in hexafluorobenzene. The apparatus for stress relaxation has been described (D. W. Brown and L. A. Wall, J. Polym. Sci., Polym. Chem. So. 10, 2967 (1972).

Table I shows that the fluorocarbon polymers of the group defined above, when treated with dilute fluorine according to the process of the present invention, are crosslinked. Table II shows that other fluorocarbon polymers under the same conditions are degraded, as shown by the lower intrinsic viscosities of the fluorine treated polymers.

Crosslinking of 2:1 Tetrafluoroethylene-3,3,3-Trifluoropropene Copolymer

A 0.004 in. thick film of subject TFE-TFP copolymer was exposed in the batch reactor to 5 mol % fluorine in helium for 20 hours at 25°C. as described above.

An identical sample of the copolymer was exposed in the flow reactor to a stream of 5 mol % fluorine in helium flowing at 600 cc./hr. at 25°C. for 18 hours.

For comparative purposes, identical samples of the copolymer were crosslinked by exposure to gamma radiation in known manner.

The polymer samples thus treated were evaluated by determining their weight swelling ratios in hexafluorobenzene and their gel fractions.

Table III shows that on exposure to dilute fluorine the polymer crosslinks to form a vulcanizate containing half as much sol and exhibiting a somewhat lower swelling ratio (Example 11) than that formed by irradiation.

Figure 1:
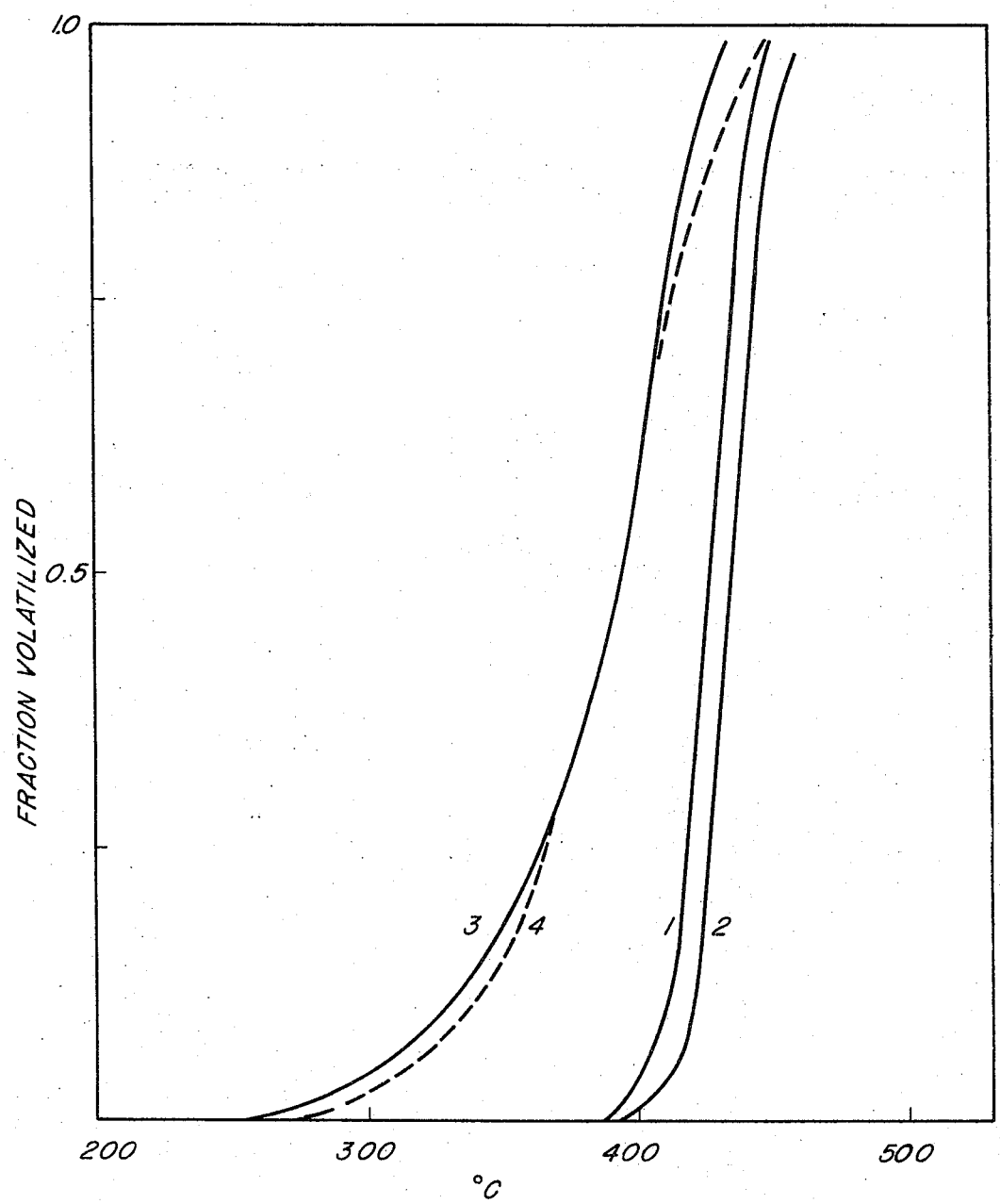

Thermographic analyses in vacuum were made on the untreated polymer, the fluorine formed vulcanizate and gel (vulcanizate sol extracted), and the radiation formed vulcanizate and gel, obtained above. FIG. 1 shows that the fluorine formed gel (curve 2) is somewhat more stable than the untreated polymer (curve 1), and much more stable than the vulcanizate (curve 3) and gel (curve 4) formed by irradiation with 38 Meg R Dose. The improvement, particularly with respect to stability, obtained by crosslinking with dilute fluorine treatment is very striking.

In Table IV are results obtained by treating Viton with dilute fluorine for various times. In each case one fourth as many fluorine molecules were charged as there were monomer units in the polymer. No sample gained in weight in these experiments. The amounts of bromine and hydrogen fluoride collected after exposure were expressed in molecules per momomer unit. Consequently, the bromine yield would equal 0.25 if reaction were nil. At 64 hours about 85% of the fluorine had not reacted. Table IV contains also the fraction of crosslinked monomer units, as calculated from the gel fractions (assuming a weight average molecular weight of 800,000 and no scissioning). Many fewer monomer units were crosslinked than were fluorine molecules charged. Probably most of the fluorine consumed actually reacts with the reactor and the erratic ratios of bromine collected to fluorine charged reflect different degrees of prior passivation of the reactor. As a consequence of the slow reaction the ratio of fluorine to monomer units is not critical, important variables being fluorine concentration, film thickness, time and temperature.

Figure 3:
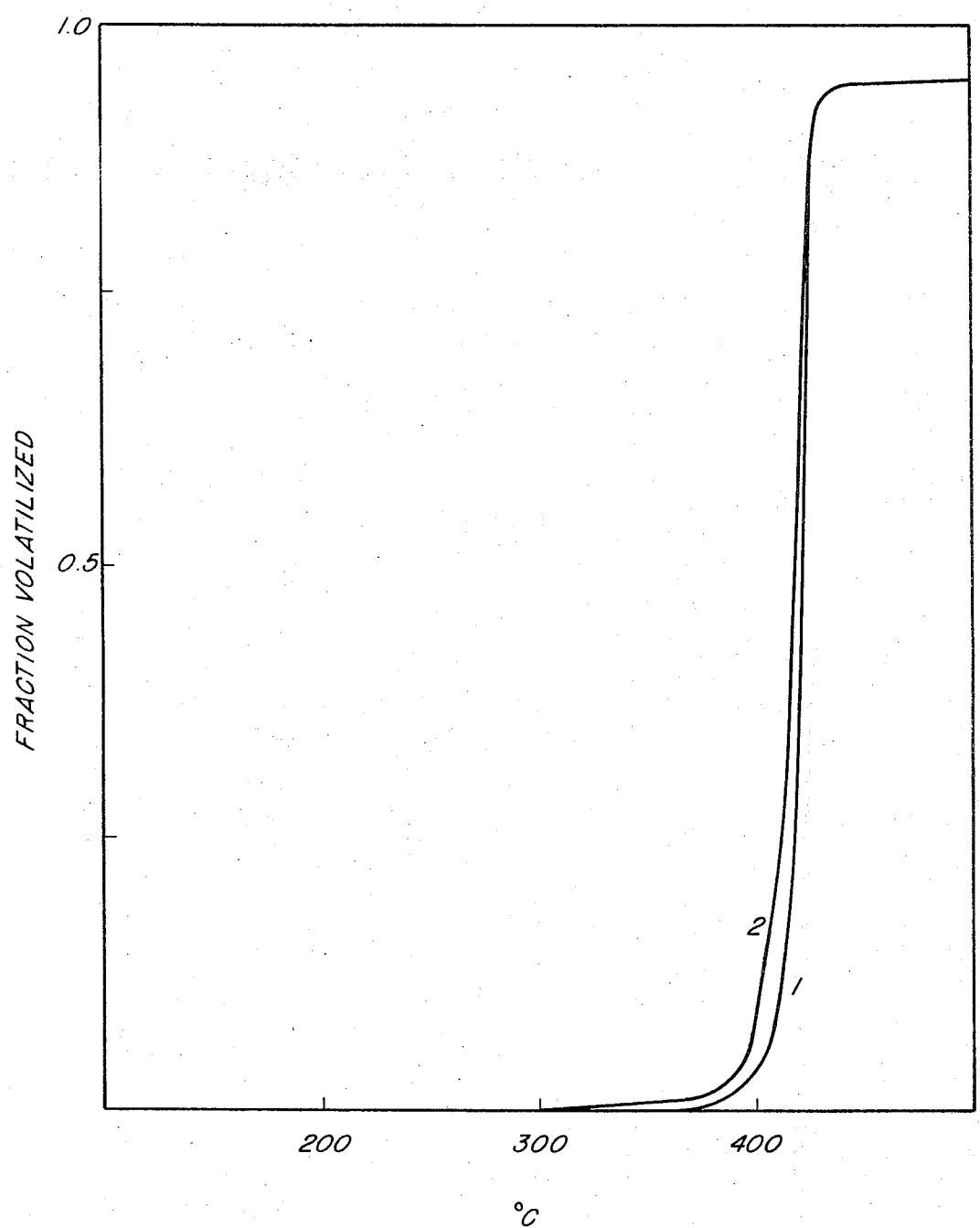

Thermographic analyses in vacuum were performed on untreated Viton and Viton exposed to fluorine, as described in Example 7. FIG. 3 shows that the untreated (curve 1) and the fluorine treated Viton samples (curve 2) possessed closely similar thermal stability.

Stress relaxation at constant length is a sensitive technique for detecting the degradation of a vulcanizate. At 250°C. in air the vulcanizate of example 15 lost 10% of an imposed stress in 30 hours. Permanent set was 25% of the initial strain. A conventional vulcanizate at 250°C. lost 85% of the imposed stress in 14 hrs.; after 24 hours the permanent set was 91% of the initial strain (D. K. Thomas, J. Appl. Polymer Sci. 8, 1415 (1964).

The present invention is particular value for producing films and coatings of improved stability from Viton and other fluorocarbon polymers noted above, for example, on the interior surfaces of jet fuel tanks for high performance aircraft where such coatings must possess high thermal stability and resistance to jet fuels. Such coatings can be prepared simply by coating the interior tank surfaces with a solution of the polymer in a suitable solvent, removing the solvent by evaporation with heating, if necessary, and then introducing dilute fluorine gas into the tank according to the process of the present invention to effect crosslinking of the polymer to produce the cured coating, i.e., vulcanizate.

The process of the present invention can be carried out by contacting a fluorocarbon polymer of the aforesaid group with elemental fluorine diluted with at least 5 times and usually between about 10 and about 100 times its volume of an inert gas, e.g., helium, argon and nitrogen, preferably at a temperature between about 0°C. and about 50°C. for a suitable period, whereby crosslinking of the polymer results (as shown, for example, by an increase in the gel content of the vulcanizate) and little or no fluorine is introduced into the polymer molecule, i.e., corresponding generally to less than 1% increase in weight of the polymer. Reaction temperatures as low as −30°C. and up to +100°C. can be employed, although temperatures between about 0°C. and about 50°C. are preferred. Also, the process can be carried out under atmospheric, subatmospheric and superatmospheric pressures, e.g., 5 atmospheres. Further, the amount of fluorine employed can vary from about 1 mol % to about 100 mol % of fluorine per monomer unit of polymer, although the degree of crosslinking obtained depends also on the time of exposure, concentration of fluorine, thickness of the polymer film, etc. In general, as is well known or obvious, the concentration and amount of fluorine, temperature, pressure and time of reaction and thickness of the polymer sample are interrelated variables and can offset one another, within limits. While in the present process the fluorine must be diluted with at least 5 times its volume of inert gas, the upper limit of fluorine concentration depends on the particular polymer to be crosslinked (polymers with higher fluorine content can usually tolerate a higher fluorine concentration than polymers with a relatively low fluorine content) and the substrate material, if used, e.g., the surface to be coated with the polymer, to avoid possible combustion of the substrate material, e.g., aluminum, by reaction with fluorine. The variation of the gel fraction with exposure time, temperature and thickness of the polymer film can be illustrated with Viton films exposed to 5 mol % fluorine in helium under ambient temperature and pressure in a batch reactor, wherein the concentration of the fluorine molecules was about 10% of the number of monomer units of the polymer: After 5 hours exposure a 0.002 inch thick piece had more gel (90%) than a 0.006 inch piece (60%). Between 15 and 64 hours the gel contents were similar for both of these thicknesses. Pieces 0.035 inch thick had less gel even at 63 hours. In 15 hours a 2.5 fold increase in fluorine concentration had little effect on gel contents at thicknesses of 0.002 and 0.006 inch. Pieces 0.006 inch thick formed more gel in 15 hours at 100°C. than at 25°C. The gel formed at 100°C. had a swelling ratio of 13, whereas gels formed at 25°C. in 15 hours had swelling ratios of 5.5–7.7.

The foregoing disclosure is merely illustrative of the principles of this invention and is not be interpreted in a limiting sense. We wish it to be understood that we do not desire to be limited to exact details of construction shown and described for obvious modifications will occur to a person skilled in the art.

TABLE I

Crosslinking of polymers by exposure to $F_2$[a]

| Ex. | Polymer | $C_2F_4$, mol percent | Sol, wt. percent | Swelling ratio,[b] swollen wt./dry wt. | $T_g$,[c] °C. |
|---|---|---|---|---|---|
| 1 | $CH_2CH$ $CF_3$ | 0 | 93 | | 27 |
| 2 | $(CH_2CH)(C_2F_4)$ $CF_3$ | 53 | 46 | 55 | 15 |
| 3 | $(CH_2CH)(C_2F_4)$ $CF_3$ | 64 | 4.9 | 11.5 | 10 |
| 4 | $(CH_2CH)(C_2F_4)$ $C_3F_7$ | 76 | 97 | 12 | 28 |
| 5 | $CF_2CF$ $C_6F_5$ | 0 | 95 | 20 | 194 |
| 6 | $CF_2CF$ $C_6H_5$ | 0 | [d] 70 | | 202 |
| 7 | Viton | 0 | 42 | 22 | −50 |
| 8 | Kel-F elastomer | 0 | [e] 51 | [e] 31 | |
| 9 | $CH_2CH$ $C_6F_5$ | 0 | 63 | 95 | 105 |

[a] Polymer films 0.025–0.1 mm. thick exposed for 20 hrs. at 25° C. to 5 mol percent $F_2$ in He. $F_2$ charged to reactor was 10 mol percent of monomer units in polymer.
[b] In $C_6F_6$ at 25° C. except as indicated.
[c] Determined by differential scanning calorimetry.
[d] In $C_6H_6$.
[e] In $C_2H_5COCH_3$.

TABLE II

Degradation of polymers by exposure to $F_2$[a]

| Polymer | $C_2F_4$, mol percent | $[\eta]_0$,[b] dl./g. | $[\eta]$,[b] dl./g. | $T_g$,[c] °C. |
|---|---|---|---|---|
| $CH_2CF$ $CF_3$ | 0 | 4.28 | 2.52 | 42 |
| $(CH_2CF)(C_2F_4)$ $CF_3$ | 79 | 4.04 | 3.89 | 7 |
| $CHFCH$ $CF_3$ | 0 | 0.23 | 0.20 | 85 |
| $CH_2CH$ $C_3F_7$ | 0 | 0.63 | 0.43 | 58 |
| $(CH_2C\overset{CF_3}{\underset{CF_3}{}})(C_2F_4)$ | 80 | 2.62 | 2.16 | 50 |

[a] Polymer films 0.025–0.1 mm. thick exposed for 20 hrs. at 25° C. to 5 mol percent $F_2$ in He. $F_2$ charged was 10 mol percent of monomer units in polymer.
[b] In $C_6F_6$ at 29.8° C. $[\eta]_0$ and $[\eta]$ represent the intrinsic viscosities of the polymer before and after exposure to $F_2$, respectively.
[c] By differential scanning calorimetry.

Table III

Crosslinking of 2:1 Tetrafluoroethylene-3,3,3-Trifluoropropene Copolymer[a]

| Example | Dose Meg R | Sol % | Volume Ratio Swollen/Dry | Elastic Chains (mol/gram)10⁵ |
|---|---|---|---|---|
| | 0 | 100 | ∞ | 0 |
| | 11 | 14 | 9.7 | 2.5 |
| | 16 | 15 | 7.8 | 3.8 |
| | 38 | 13 | 7.1 | 4.2 |
| | 55 | 11 | 7.0 | 4.8 |
| 10 | 0[b] | 4.9 | 12.8 | 1.2 |
| 11 | 0[c] | 4.2 | 6.6 | 5.0 |

[a] Initial intrinsic viscosity 5.0 dl/g in hexafluorobenzene at 29.8°C.
[b] 0.004" thick film exposed for 20 hrs at 25°C. to 5 mol % in He. $F_2$ charged was about 10 % of monomer units in polymer
[c] Exposed to 600 cc/hr of flowing He, $F_2$ (20:1) for 18 hrs.

Table IV

Effect of 5% Fluorine on Viton at 25°C.

| Example | Time Hours | BR$_2$ Molecule/Monomer Unit | HF Molecule/Monomer Unit | Gel Fraction | X-Linked Units Fraction × 10$^4$ | SR[b] |
|---|---|---|---|---|---|---|
| 12 | 5 | 0.25 | 0.02 | 0.60 | 2 | 14 |
| 13 | 15 | 0.15 | 0.06 | 0.92 | 4.8 | 5.5 |
| 14 | 40 | 0.12 | 0.08 | 0.90 | 5.5 | 5.1 |
| 15 | 64 | 0.22 | lost | 0.98 | 12 | 4.3 |

[a] Initial [F$_2$] = 3.3 × 10$^{-3}$ M, molecules F$_2$/Monomer Unit = 0.25. Sample thickness = 0.006 in.
[b] Weight swelling ratio in C$_6$F$_6$.

What is claimed is:

1. A process for crosslinking fluorocarbon polymers without requiring the use of solid or liquid additives selected from the group consisting of
   3,3,3-trifluoropropene homopolymers
   α,β,β-trifluorostyrene homopolymers
   1,2,3,4,5-pentafluorostyrene homopolymers
   vinylidene fluoride-hexafluoropropene copolymers
   vinylidene fluoride-chlorotrifluoroethylene copolymers
   3,3,3-trifluoropropene-tetrafluoroethylene copolymers
   5,5,5,4,4,3,3-heptafluoropentene-1-tetrafluoroethylene copolymers
which comprises contacting the polymer with gaseous fluorine diluted with at least about 5 times its volume of an inert gas so that crosslinking of the polymer is accomplished with substantially no introduction of fluorine into the polymer.

2. The process according to claim 1, wherein the fluorine is diluted with at least about 10 times its volume of helium.

3. The process according to claim 1, wherein the polymer is contacted with the diluted fluorine at a temperature between about 0°C. and about 50°C.

4. The process according to claim 1, wherein the polymer is contacted with the diluted fluorine under substantially atmospheric pressure.

5. The process according to claim 1, wherein the polymer is contacted with fluorine diluted with at least 10 times its volume of helium at a temperature between about 0°C. and about 50°C. under a pressure below 5 atmospheres.

6. The process of claim 1, wherein the polymer is a vinylidene fluoridehexafluoropropene copolymer.

7. The process of claim 6, wherein the copolymer contains about 4 vinylidene fluoride monomer units per hexafluoropropene monomer unit.

8. The process of claim 1, wherein the polymer is a vinylidene fluoridechlorotrifluoroethylene copolymer.

9. The process of claim 1, wherein the polymer is in the form of a film.

10. A crosslinked polymer obtained by the process of claim 1.

11. A crosslinked polymer obtained by the process of claim 6.

12. A crosslinked polymer obtained by the process of claim 7.

13. A crosslinked polymer obtained by the process of claim 8.

* * * * *